United States Patent [19]

Baldoni, II et al.

[11] Patent Number: 4,710,425
[45] Date of Patent: Dec. 1, 1987

[54] ABRASION RESISTANT ARTICLES AND COMPOSITION UTILIZING A BORON-DOPED REFRACTORY PARTICLE

[75] Inventors: J. Gary Baldoni, II, Walpole; Sergej-Tomislav Buljan, Acton; Vinod K. Sarin, Lexington, all of Mass.

[73] Assignee: GTE Laboratories Inc., Waltham, Mass.

[21] Appl. No.: 809,939

[22] Filed: Dec. 17, 1985

[51] Int. Cl.$^4$ .......... B32B 9/00; C04B 35/58; B24D 3/34
[52] U.S. Cl. .................. 428/328; 428/698; 428/704; 51/307; 501/93; 501/97
[58] Field of Search .......... 428/328, 698, 704, 402; 51/307; 501/93, 97; 420/417, 424

[56] References Cited

U.S. PATENT DOCUMENTS

| | | | |
|---|---|---|---|
| 2,694,007 | 11/1954 | Goetzel et al. | 419/17 |
| 3,270,412 | 9/1966 | Vordahl | 228/116 |
| 3,343,952 | 9/1967 | Delgrosso et al. | 419/15 |
| 3,458,366 | 7/1969 | Chang | 148/401 |
| 3,497,368 | 2/1970 | Williams et al. | 501/93 |
| 3,558,343 | 1/1971 | Darnell et al. | 427/249 |
| 3,720,551 | 3/1973 | Allen | 419/10 |
| 3,881,991 | 5/1975 | Cheney et al. | 75/0.5 BB |
| 3,883,389 | 9/1974 | Komeya et al. | 501/92 |
| 3,993,478 | 11/1976 | Hay et al. | 148/435 |
| 4,113,830 | 9/1978 | Mazdiyasni | 501/97 |
| 4,127,629 | 11/1978 | Weaver et al. | 264/63 |
| 4,323,325 | 4/1982 | Samanta et al. | 409/131 |
| 4,350,771 | 9/1982 | Smith | 501/97 |
| 4,388,085 | 6/1983 | Sarin et al. | 51/307 |
| 4,406,668 | 9/1983 | Sarin et al. | 51/307 |
| 4,433,979 | 2/1984 | Sarin et al. | 51/307 |
| 4,497,228 | 2/1985 | Sarin et al. | 82/1 |

OTHER PUBLICATIONS

"Fabrication of Si$_3$N$_y$ Ceramics with Metal Nitride Additives by Isostatic Hot Pressing", Uchida et al, J. Am. Ceram. Soc. 68, [2] C-38-C40 (1985).
W. S. Williams, Transctions of the Metallurgical Society of Aime, vol. 236, 211-215 (1966).
Kirk-Othmer Encyclopedia of Chemical Technology, vol. 23, pp. 299-303 (John Wiley & Sons, NY) (1983).

Primary Examiner—John E. Kittle
Assistant Examiner—Susan S. Rucker
Attorney, Agent, or Firm—Ernest V. Linek

[57] ABSTRACT

This invention relates to abrasion resistant materials and to articles of manufacture made therefrom. More particularly, it is concerned with abrasion resistant materials comprising boron doped TiC or boron doped VC distributed in a matrix containing silicon nitride and with articles made therefrom.

19 Claims, 1 Drawing Figure

ABRASION RESISTANT ARTICLES AND COMPOSITION UTILIZING A BORON-DOPED REFRACTORY PARTICLE

FIELD OF THE INVENTION

This invention relates to abrasion resistant materials and to articles of manufacture made therefrom. More particularly, it is concerned with abrasion resistant materials comprising a strengthened refractory material distributed in a ceramic matrix such as silicon nitride, silicon-aluminum-oxynitride, and the like, and with articles made therefrom.

BACKGROUND OF THE INVENTION

In machining operations, a cutting tool is subjected to stress and elevated temperatures resulting from friction and metal shear. Under such conditions, the cutting edge undergoes continuous change due to wear. Several different concurrent wear processes and their severity determine the tool life. The dominant wear mode of the tool varies depending on the environment which in a broader sense includes all conditions of use (workpiece material, stress, atmosphere, etc.).

In practice, based on extensive testing of $Al_2O_3$, $Al_2O_3$—TiC, $Si_3N_4$ and $Si_3N_4$—TiC cutting tools, it has been found that ceramic tools during gray cast iron machining wear primarily by abrasion.

Material removal by fracture that occurs in abrasion can be assumed to take place when lateral cracks of adjacent indentations caused by penetration of sharp surface protrusions (or abrasive particles as in pin and disc wear tests) of the opposing surface intersect. The removed volume (V) is then:

$$V_i = r_i h_i l_i$$

where $r_i$ is critical indentation separation, $h_i$ is the depth of the indentation, and $l_i$ is the sliding distance.

Considering the dependence of the size of the indent and the length of cracks emanating from such angular indentations on the hardness (H) and fracture toughness ($K_{IC}$), respectively, the following expression for maximum volume removed by the system of indentors in a grinding operation was derived by Evans and Wilshaw; Acta. Met., 24, 939–956 (1976)

$$V \alpha \frac{1}{K_{IC}^{3/4} H^{1/2}} \sum_{i=1}^{i=N} P_i^{5/4} l_i = \frac{1}{K_{IC}^{3/4} H^{1/2}} N \overline{P}^{5/4} \overline{l}$$

where N is the number of abrasive particles and P is a vertical force on the particle. From experimental wear data obtained using a pin-on-disc method under constant load, the abrasion resistance for a series of $Al_2O_3$ and $Si_3N_4$-based ceramic cutting tool materials was found to be directly proportional to $K_{IC}^{3/4} H^{1/2}$. This abrasive wear resistance parameter, expressed as the inverse of volume removed per unit length of travel, provides a relative ranking of materials.

A silicon nitride ($Si_3N_4$) based composite material containing thirty volume percent titanium carbide (TiC) is presently being marketed by GTE as a metal cutting tool under the name Quantum 5000. The TiC is added to increase the hardness of the composite compared to $Si_3N_4$ and thus increase its abrasive wear resistance. See also, U.S. Pat. No. 4,333,979 to Sarin et al.

In many metal cutting operations, the high rate shear strain which separates the chip from the workpiece is converted into thermal energy and high cutting temperatures (in the range of about 800°–1200° C.) are generated. Therefore, the mechanical properties at high temperature are important in determining cutting tool performance and abrasive wear resistance.

Due to the temperatures generated at the cutting edge of a metal cutting tool, the high temperature hardness of the tool material is a critical factor in the tool performance. Improvement in the high temperature hardness of a $Si_3N_4$—TiC material by the addition of a carbide phase with improved high temperature hardness can result in an improved cutting performance when used as a cutting tool material.

SUMMARY OF THE INVENTION

The invention is directed to abrasion resistant materials and articles made therefrom, having improved wear characteristics and high hardness, comprising boron doped TiC or VC particles with an average particle size below about 20 μm, dispersed in a ceramic matrix.

The preferred ceramic matrix is a highly densified polycrystalline matrix comprising silicon nitride and a densification aid. This densification aid preferably comprises from 1 to 25 weight percent of the silicon nitride matrix and is preferably selected from the group consisting of oxides or nitrides of magnesium, aluminum, silicon, yttrium, zirconium, hafnium, lanthanides and mixtures thereof.

The present invention also includes cutting tools coated with one or more wear resistant refractory materials, produced by depositing one or more adherent layers on the articles of the present invention.

DETAILED DESCRIPTION OF THE PREFERRED EMBODIMENTS

Figure 1:
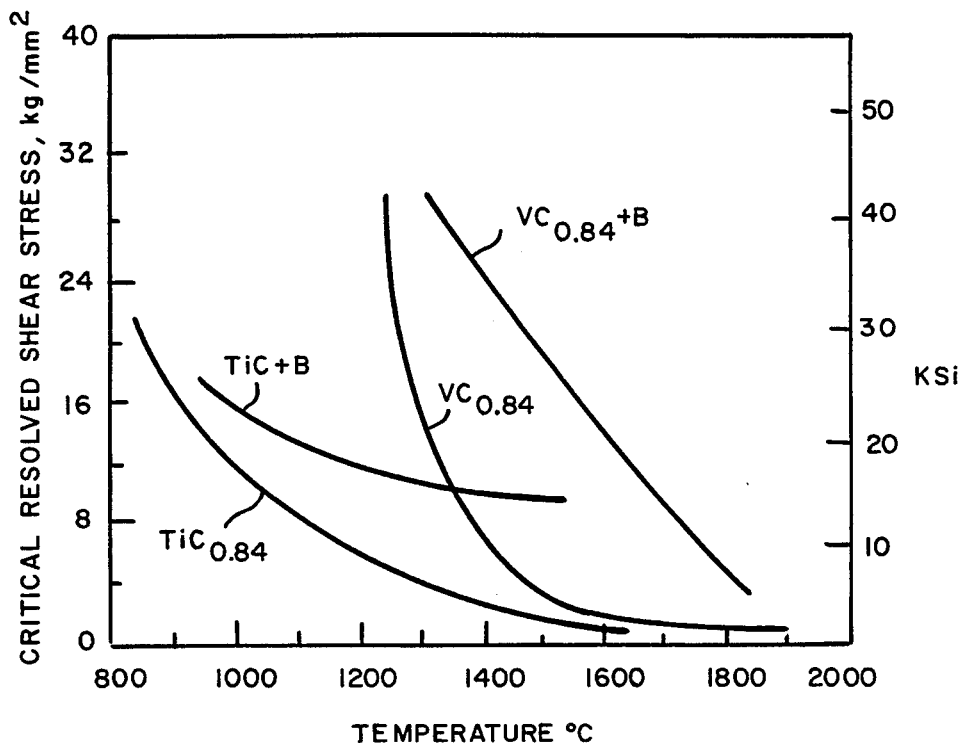
FIG. 1 illustrates the decrease in critical resolved sheer stress as a function of increasing temperature for TiC and VC and their counterparts doped with Boron.

Abrasion resistant articles according to the present invention comprise finely divided particles of one or more strengthened refractory materials dispersed in a ceramic matrix.

The term "strengthened refractory material", as used throughout this specification and the appended claims, means any refractory material strengthened to withstand deformation at high temperature.

Strengthened refractory materials generally have a microhardness greater than about 1000 kg/mm² and a fusion or decomposition temperature greater than about 1500° C. Typical strengthened refractory materials include the carbides and nitrides, or combinations thereof, including solid solutions of, titanium, vanadium, niobium, hafnium, and tantalum, containing a strengthening agent, such as for example, boron.

Strengthened refractory materials are known and may be obtained via any of the processes available to the skilled artisan for their preparation. Several such materials and/or processes for their preparation are disclosed in Williams et al., U.S. Pat. No. 3,497,368.

A preferred strengthening agent for the preparation of strengthened carbides, nitride, and like refractory materials is boron incorporated at from about 0.5 to 5.0 weight percent as described by Williams et al., supra, the disclosure of which is incorporated herein by reference.

The average particle size of the strengthened refractory material incorporated into articles in accordance with this invention is chosen dependent upon the use to which the article is put, but generally ranges below about 20 microns. For example, in cutting tool applications, the average particle size is chosen near the lower end of the range, preferably below about 5 microns. On the other hand, for mining tools and wear parts average particle sizes above 5 microns may be used.

The useful life and performance of articles in accordance with this invention depend, in large part, on the volume taken up by the particles of strengthened refractory material in the article. The strengthened material should comprise from about 1% to about 50% by volume of the densified article. The preferred range of refractory material incorporation is from about 15% to about 50% by volume. A more preferred range is from about 20 to about 40 volume percent.

The term "ceramic matrix" as used throughout this specification and the appended claims, means any of the ceramic materials employed in cutting tool applications. Such materials are well known to the skilled artisan, and include alumina based materials, such as General Electric's alumina-TiO ceramic (grade 0-30) and alumina-zirconium-tungsten ceramic (grades 440 and 460), both available from General Electric's Carboloy Systems Department; Carborundum Company's CCT707 ceramic, a nearly pure alumina containing a minor amount of MgO; silicon nitride ceramics, such as the Ford Motor Co. ceramic containing up to about 12 percent yttria (grade S8) and the like. See for example, the *Kirk-Othmer Encyclopedia of Chemical Technology*, Vol. 23, pp 299-303 (John Wiley & Sons, New York, 1983).

In accordance with the preferred embodiment of the present invention, strengthened refractory materials are uniformly distributed in a highly densified polycrystalline ceramic matrix. A preferred ceramic matrix of this type is dissolved in U.S. Pat. No. 4,433,979 to V. K. Sarin et al., the disclosure of which is incorporated herein by reference.

Most preferably, the first phase comprises silicon nitride, and the second intergranular phase or (secondary phase) comprises silicon nitride and an effective amount of a densification aid. For optimizing the desirable properties, particularly high temperature strength of the composite of the present invention, it is preferable to maximize the high temperature stability of the secondary intergranular phase and maximize the density of the final densified composites. While a densification aid is essential to achieve high densities, that is, densities approaching theoretical, improper composition of the second phase can deleteriously affect maximum attainable high temperature strength and creep resistance.

Densification aids of the preferred compositions stabilize the secondary phase to such an extent that the secondary phase is a refractory phase having desirable high temperature properties. Typical densification aids are yttrium oxide, zirconium oxide, hafnium oxide and the lanthanide rare earth oxides and mixtures thereof. Yttrium oxide, hafnium oxide and cerium oxide are preferred densification aids. The densification aid is employed from a lower effective amount which permits high theoretical densities to an upper amount which does not unduly effect the high temperature properties. Preferably the densification aid comprises from about 1 to about 25 weight percent of the matrix. More preferably, from about 1 to about 5 weight percent of the matrix.

For optimizing the desirable high temperature properties of the composite of the preferred embodiments, it is desirable to minimize the presence of any additive such as aluminum oxide, at least to the extent that the favorable desirable high temperature properties of the final article are unfavorably effected by alteration of the secondary phase. Preferably aluminum oxide is present in the matrix in an amount less than about 5 percent by weight based on the total weight of the matrix material, more preferably less than about 3 percent.

The secondary intergranular phase may contain additional materials in the form of additives and impurities in addition to the previously mentioned densification aids and additives such as aluminum oxide. Such additional materials may contribute to the desired final properties. Such additional materials are preferably present in an amount less than about 5 percent by weight based on the weight of the secondary phase. It is contemplated that silicon oxide may be one such additional material.

In silicon nitride bodies having a crystalline silicon nitride phase and a secondary phase, it has been found that silicon oxide present in a effective amount enables optimization of oxidation resistance in such bodies, see T. Smith, U.S. Pat. No. 4,350,771, the disclosure of which is incorporated herein by reference.

Impurities may be present in the starting powder used for the manufacture of the composite of the present invention. These impurities tend to become concentrated in the intergranular phase during preparation of the composite. Preferably the purity of the starting powder is high, having less than about 0.1 weight percent cation impurities. A typical undesirable impurity is calcium which tends to deleteriously affect the secondary phase and high temperature properties.

The preferred materials described herein have a composite microstructure of a refractory material, $Si_3N_4$ grain, and a secondary intergranular phase comprising silicon nitride and the densifying additive. As previously mentioned, impurities and additives present in the body tend to concentrate in the secondary intergranular phase. Because the secondary intergranular phase is continuous, its characteristics profoundly affect the high temperature properties of the composite material. The preferred composites of the present invention possess high strength at temperatures in excess of 1200° C., preferably in excess of 1500° C.

The present invention also includes coated materials. As used herein, the term "refractory coating" refers to those hard, refractory, chemically stable, chemically inert, generally binderless coatings which are employed in the cutting tool industry. Such materials include single or multiple coatings of TiC, TiN, $Al_2O_3$, HfN, HfC, which are generally deposited via vapor phase techniques (e.g. CVD). Coatings generally range in thickness up to about 20 $\mu$m. For a discussion of coated tools see, the *Kirk-Othmer Encyclopedia of Chemical Technology*, Vol. 23, pp 295-299 (John Wiley & Sons, New York, 1983), the disclosure of which is incorporated herein by reference.

In preferred embodiments of the present invention, the starting powder composition consists essentially of from about 25% to about 95% by weight of a silicon nitride powder, from about 1% to about 10% by weight of a powdered densification aid, and from about 5 to 40 percent by weight of a strengthened refractory material powder. Additional ingredients are preferably present in the starting powder in amounts less than about 5 percent by weight based on total weight of the starting powder.

The strengthened refractory particulate is dispersed in a ceramic matrix which is compacted to a high density by sintering or hot pressing techniques. A preferred composition for the production of abrasion resistant materials made by employing $Si_3N_4$ powder, generally of particle size below about 3 microns, which is preferably either partly crystallized amorphous material or a mixture of substantially completely amorphous and substantially completely crystalline material. The crystalline $Si_3N_4$ which may be either the alpha, the beta polymorph, or a mixture of these, is preferably present in the amount of from about 5% to 60% by weight of the total amount of $Si_3N_4$ powder, the remainder being substantially amorphous. Silicon nitride ceramics produced from such starting materials exhibit good to excellent densities and modulus of rupture values, as well as acceptable shrinkage values of the powder compacts during sintering.

The percent crystallinity of the starting material, if unknown, may be determined either by x-ray diffraction techniques, in which the intensity of the diffraction peaks of crystalline material is compared to a standard, or by infrared spectroscopy, in which the relative intensities of the broad absorption peak of the amorphous material and the narrow peaks of the crystalline material are compared.

Densification of silicon nitride and the strengthened refractory material is aided by the incorporation of a densification aid into the initial composition. In the initial powder compositions employed in the fabrication, the densification aid comprises initially from about 1% to about 10% by weight of the powder composition to a highly densified product, the strengthened refractory metal carbide comprises from about 1% to about 60% of the total volume of the densified article as set out above. In the densified article, the balance of the article comprises the matrix of polycrystalline silicon nitride and the densification aid. In such a densified article, the densification aid makes up from about 1% to about 25% by weight of the host matrix.

The starting materials may be processed to a powder compact of adequate green strength by thoroughly mixing the starting materials by process such as ball milling in a nonreactive liquid medium, such as toluene or methanol, and consolidating the mixture by pressing, extruding, or slip casting. Processing may also optionally include a presintering or prereacting step in which either the uncompacted powder or the powder compact is heated at moderate temperatures.

The preferred host matrix comprises a two phase system made up of a first phase silicon nitride grains and a secondary phase including the densification aid. The particles of strengthened refractory material are uniformly dispersed throughout this matrix. Since the strength of articles in accordance with this invention decreases with increasing porosity in the total compact, it is important that the compact be sintered or pressed to a density as nearly approaching 100% theoretical density as possible. By theoretical is meant the value obtained by a weighted average of the densities of the components of the compact. Particular resistance to oxidation is conferred upon abrasion resistant articles of this invention by preferred densification aids. Yttrium oxide, hafnium oxide and cerium oxide are preferred densification aids.

The porosity of articles of this invention is extremely low. The resulting strength of such articles is greater than that of silicon nitride based articles obtained by nitriding techniques or reaction bonding methods. The density of such articles is generally of the order of about 80% of theoretical.

Densified ceramic articles made in accordance with this invention are strong, nonporous, abrasion resistant, and resistant to oxidation. Applications of these articles include, but are not limited to cutting tools, mining tools, stamping and deep-drawing tools, extrusion dies, wire and tube drawing dies, nozzles, guides, bearings, and wear-resistant, and structural parts.

The cutting tool of the present invention may be prepared in any manner available to the skilled artisan. In a preferred method of preparation, the tool material is densified from a powder mixture of about 1% to about 25% preferably about 1 to about 15% by weight of a densification aid, up to 50 volume percent of a metal carbide dispersoid and a balance consisting essentially of $Si_3N_4$, by hot pressing at a predetermined pressure, the pressure being maintained continuously during heating at an ultimate pressing temperature of about 1650° C. to about 1800° C., advantageously about 1700° C. to about 1750° C., until substantially full density is obtained.

It is advantageous to carry out the hot pressing at a pressure of about 3000 psi to about, 9000 psi, preferably about 4000 psi to about 5000 psi, for about 1 to about 4 hours to effect a single refractory secondary phase in the grain boundaries of the $Si_3N_4$ body.

This hot pressed ceramic is shaped into a ceramic cutting tool for continuous or interrupted machine cutting of stock in conventional machine cutting operations, e.g., milling, turning, boring and other shear cutting modes. As used herein the term "milling" means the machine cutting of metal made in a making, shaping, dressing or finishing operation or process, and is not meant to distinguish between species of conventional metal cutting machines such as planars wherein the workpiece moves longitudinally below a tool holder that moves in a vertical plane and so-called milling machines wherein the workpiece is stationary and the tool holder moves vertically and horizontally to selected spots for chip removal from the surface of the metal stock. The term "chip" used herein means the portion of the stock that is severed by shearing action of the tool as it moves relative to and against the stock.

Other processes are available for making strengthened ceramics with a density and accompanying physical properties within the scope suitable for use in this invention.

The wear of the preferred silicon nitride tools of this invention in machining gray cast iron was found to be predominantly mechanical in nature and therefore proportional to the wear resistance parameter $K_{IC}^{3/4} H^{1/2}$.

For these materials, the hardness equals approximately three times the yield stress, for single crystals this is three times the critical resolved shear stress. See Table I.

| Material | σy (kg/mm$^2$) | H (kg/mm$^2$) | H$^{\frac{1}{2}}$K$_{IC}^{\frac{3}{4}}$ | Relative Abrasive Wear Resistance* $\frac{(H^{\frac{1}{2}}K_{IC}^{\frac{3}{4}}) \text{ Boron doped}}{H^{\frac{1}{2}}K_{IC}^{\frac{3}{4}}) \text{ undoped}}$ |
|---|---|---|---|---|
| At 1100° C. | | | | |
| TiC | 10 | 30 | 5.5 K$_{IC}^{\frac{3}{4}}$ | 1.00 |
| B doped TiC | 14 | 42 | 6.5 K$_{IC}^{\frac{3}{4}}$ | 1.18 |
| At 1200° C. | | | | |
| TiC | 7 | 21 | 4.6 K$_{IC}^{\frac{3}{4}}$ | 1.00 |
| B doped TiC | 12.4 | 37.2 | 6.1 K$_{IC}^{\frac{3}{4}}$ | 1.33 |

*Relative wear resistance is the ratio of H$^{\frac{1}{2}}$K$_{IC}^{\frac{3}{4}}$(boron doped)/H$^{\frac{1}{2}}$K$_{IC}^{\frac{3}{4}}$ (undoped).

The boron doped TiC part shows an 18 percent increase in abrasive wear resistance at 1100° C. compared to undoped TiC part and a 33 percent increase at 1200° C.

There are thus provided by the present invention improved abrasion resistant materials having high hardness, improved wear resistance, and increased resistance to oxidation. While there have been shown what are at present considered to be the preferred embodiments of the invention, it will be obvious to those skilled in the art that various changes and modifications may be made therein without departing from the scope of the invention as defined by the appended claims.

What is claimed is:

1. An improved abrasion resistant composition consisting essentially of a densified ceramic matrix having dispersed therein, at least one refractory dispersoid doped with boron, said refractory dispersoid having an average particle size below about 20 μm.

2. The abrasion resistant composition of claim 1, wherein the dispersoid is boron doped TiC.

3. The abrasion resistant composition of claim 1, wherein the dispersoid is boron doped vandium carbide.

4. The improved abrasion resistant composition of claim 1, which consists essentially of a silicon nitride matrix having dispersed therein up to about 50 volume percent of a refractory metal carbide or nitride dispersoid doped with boron; and from about 1 to 25 weight percent of a densification aid selected from the group consisting of oxides or nitrides of magnesium, aluminum, silicon, yttrium, zirconium, hafnium, lanthanides and mixtures thereof.

5. The abrasion resistant composition of claim 4, wherein the dispersoid has an average particle size below about 10 μm.

6. The abrasion resistant composition of claim 4, wherein the dispersoid has an average particle size below about 1 μm.

7. The abrasion resistant composition of claim 4, wherein the dispersoid has an average particle size below about 0.5 μm.

8. The abrasion resistant cutting tool comprising a hot pressed admixture of the composition of claim 1.

9. The cutting tool of claim 8, further comprising at least one refractory coating.

10. An abrasion resistant cutting tool comprising a hot pressed admixture of the composition of claim 4.

11. The cutting tool of claim 10, further comprising at least one refractory coating.

12. An abrasion resistant cutting tool comprising a hot pressed admixture of the composition of claim 5.

13. The cutting tool of claim 12, further comprising at least one refractory coating.

14. An abrasion resistant cutting tool comprising a hot pressed admixture of the composition of claim 6.

15. The cutting tool of claim 14, further comprising at least one refractory coating.

16. An abrasion resistant cutting tool comprising a hot pressed admixture of the composition of claim 8.

17. The cutting tool of claim 16, further comprising at least one refractory coating.

18. A process for the manufacture of an abrasion resistant cutting tool comprising hot pressing of the composition of claim 1 at a pressure of from about 300 psi to 7000 psi, for from about 1 to 4 hours, at a temperature of from about 1650° C. to 1800° C., and shaping the hot pressed ceramic into a cutting tool.

19. A process for the manufacture of an abrasion resistant cutting tool comprising hot pressing of the composition of claim 4 at a pressure of from about 300 psi to 7000 psi, for from about 1 to 4 hours, at a temperature of from about 1650° C. to 1800° C., and shaping the hot pressed ceramic into a cutting tool.

* * * * *